United States Patent
Matsuda et al.

(10) Patent No.: US 10,040,125 B2
(45) Date of Patent: Aug. 7, 2018

(54) CUTTING INSERT

(71) Applicant: Sumitomo Electric Hardmetal Corp., Itami-shi (JP)

(72) Inventors: Naoki Matsuda, Sorachi-gun (JP); Yousei Tensaka, Sorachi-gun (JP); Shinya Fujisawa, Sorachi-gun (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 15 days.

(21) Appl. No.: 15/114,041

(22) PCT Filed: Feb. 26, 2015

(86) PCT No.: PCT/JP2015/055578
§ 371 (c)(1),
(2) Date: Jul. 25, 2016

(87) PCT Pub. No.: WO2015/141428
PCT Pub. Date: Sep. 24, 2015

(65) Prior Publication Data
US 2016/0339525 A1 Nov. 24, 2016

(30) Foreign Application Priority Data
Mar. 17, 2014 (JP) ................... 2014-053413

(51) Int. Cl.
*B23B 27/14* (2006.01)
*B23B 27/16* (2006.01)

(52) U.S. Cl.
CPC ........ *B23B 27/143* (2013.01); *B23B 27/1607* (2013.01); *B23B 2200/0447* (2013.01);
(Continued)

(58) Field of Classification Search
CPC ........ B23B 2200/087; B23B 2200/323; B23B 2200/3654; B23B 2200/201;
(Continued)

(56) References Cited

U.S. PATENT DOCUMENTS 3,383,748 A * 5/1968 Jones ............... B23B 27/141
407/114
4,116,576 A * 9/1978 Gawryk, Sr. ......... B23B 27/143
407/114
(Continued)

FOREIGN PATENT DOCUMENTS

CN 102905824 A 1/2013
DE 19627990 C1 * 8/1997 ........ B23B 27/141
(Continued)

OTHER PUBLICATIONS

International Search Report in International Application No. PCT/JP2015/055578, dated Apr. 28, 2015.

*Primary Examiner* — Ryan Rufo
(74) *Attorney, Agent, or Firm* — Venable LLP; Michael A. Sartori; Laura G. Remus

(57) ABSTRACT

A cutting insert includes a rake face, a flank face, a cutting edge formed at a ridge where the rake face and the flank face intersect, a land provided on the rake face along the cutting edge, a breaker groove provided in the rake face inside of the land, and a curved surface formed between a groove surface of the breaker groove and the land. A radius of curvature of the curved surface is 0.5 mm or greater.

5 Claims, 4 Drawing Sheets

(52) U.S. Cl.
CPC ..... *B23B 2200/201* (2013.01); *B23B 2200/28* (2013.01); *B23B 2200/286* (2013.01); *B23B 2200/321* (2013.01); *B23B 2200/323* (2013.01); *B23B 2200/3654* (2013.01)

(58) Field of Classification Search
CPC ............ B23B 2200/321; B23B 27/143; B23B 27/1607; B23B 27/1618; B23B 27/1648
See application file for complete search history.

(56) References Cited

U.S. PATENT DOCUMENTS

| | | | | |
|---|---|---|---|---|
| 4,318,645 | A | * | 3/1982 | McCreery ............ B23B 27/143 407/114 |
| 4,340,324 | A | | 7/1982 | McCreery |
| 4,626,141 | A | * | 12/1986 | Malaker ................ B23B 27/143 407/114 |
| 4,963,061 | A | * | 10/1990 | Katbi .................... B23B 27/143 407/113 |
| 5,192,171 | A | * | 3/1993 | Ther ..................... B23B 27/143 407/114 |
| 5,193,947 | A | * | 3/1993 | Bernadic ............... B23B 27/143 407/114 |
| 2003/0086767 | A1 | | 5/2003 | Wiman et al. |
| 2007/0160433 | A1 | | 7/2007 | Lee et al. |
| 2008/0199263 | A1 | * | 8/2008 | Jonsson .................. B23B 27/10 407/11 |
| 2008/0219784 | A1 | * | 9/2008 | Yamazaki ............. B23B 27/143 407/114 |
| 2011/0229279 | A1 | * | 9/2011 | Kobayashi ............ B23B 27/143 407/115 |
| 2013/0064613 | A1 | * | 3/2013 | Krishtul ................ B23B 27/143 407/114 |
| 2013/0094914 | A1 | * | 4/2013 | Majima ................. B23B 27/143 407/114 |

FOREIGN PATENT DOCUMENTS

| | | | |
|---|---|---|---|
| EP | 2 570 211 A1 | 3/2013 | |
| JP | S57-54008 A | 3/1982 | |
| JP | S57-54008 B2 | 3/1982 | |
| JP | H02-53302 U | 4/1990 | |
| JP | H04-17004 U | 2/1992 | |
| JP | H09-57507 A | 3/1997 | |
| JP | H09-76104 A | 3/1997 | |
| JP | 2002-066812 A | 3/2002 | |
| JP | 2002-254214 A | 9/2002 | |
| JP | 2005-342871 A * | 12/2005 | ............ B23B 27/14 |

* cited by examiner

CUTTING INSERT

TECHNICAL FIELD

The present invention relates to a cutting insert that has both high edge strength and crater wear resistance.

BACKGROUND ART

Some cutting inserts, which are required to have high edge strength, have an edge that is strengthened by forming a land on a rake face along a cutting edge (see PTL 1).

When a cutting insert is strongly required to have high edge strength, the rake angle of a land portion is reduced, a negative land having a negative rake angle is formed, or the width of the land is increased.

When a cutting insert is required to have crater wear resistance, a method such as increasing the rake angle of the land portion, reducing the width of the land, or omitting the land is used.

For example, in PTL 2, a cutting edge without a land is disposed at a corner portion having an arc-shaped edge. This is expected to have an effect of increasing crater wear resistance.

CITATION LIST

Patent Literature

PTL 1: Japanese Unexamined Patent Application Publication No. 9-57507
PTL 2: Japanese Unexamined Patent Application Publication No. 2002-66812

SUMMARY OF INVENTION

Technical Problem

When the rake angle of the land portion of a cutting insert is reduced or the width of the land is increased to satisfy the requirement for high edge strength, the cutting insert becomes less resistant to crater wear.

When the rake angle of the land portion of a cutting insert is increased, the width of the land is reduced, or the land is omitted to satisfy the requirement for crater wear resistance, the edge strength of the cutting insert is likely to decrease.

Thus, it is difficult to satisfy both requirements for high edge strength and crater wear resistance, because there is a trade-off between these requirements.

An object of the present invention is to enable a cutting insert to have both high edge strength and crater wear resistance and thereby to improve the durability of the cutting insert.

Solution to Problem

To achieve the object, a cutting insert according to the present invention includes a rake face, a flank face, a cutting edge formed at a ridge where the rake face and the flank face intersect, a land provided on the rake face along the cutting edge, a breaker groove provided in the rake face inside of the land, and a curved surface formed between a groove surface of the breaker groove and the land. A radius of curvature of the curved surface is 0.5 mm or greater.

Advantageous Effects of Invention

The cutting insert described above can have both high edge strength and crater wear resistance.

DESCRIPTION OF EMBODIMENTS

Hereinafter, a cutting insert according to an embodiment of the present invention will be described with reference to FIGS. 1 to 4.

Figure 1:
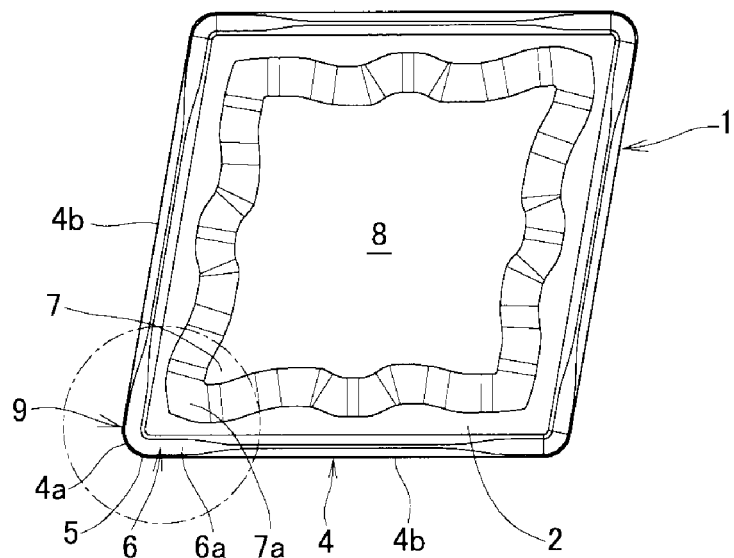
FIG. 1 is a plan view of an example of a cutting insert according to the present invention.

FIG. 1 shows an example in which the present invention is applied to a rhombic cutting insert that is used for turning.

A cutting insert 1 in the present example is a negative-type cutting insert in which a side surface, which is a flank face 3, is perpendicular to an upper surface, which is a rake face 2. A ridge where the rake face 2 and the flank face 3 intersect is used as a cutting edge 4.

The cutting edge 4 includes a corner cutting edge 4a, which has a predetermined nose radius R, and a linear cutting edge 4b, which is disposed between adjacent cutting edges 4.

The rake face 2 of the cutting insert 1 is provided with a land 5, which extends along the cutting edge 4; a breaker groove 6, which descends from the position of the land 5; a breaker ridge 7; and a central land portion 8.

If the cutting insert 1 is a one-sided cutting insert, the lower surface (not shown) is a flat surface. If the cutting insert 1 is a double-sided cutting insert, the lower surface is provided with a breaker groove, a breaker ridge, and a central land portion 8, which are the same as those of the upper surface, and the upper surface and the lower surface are finished to have the same shape.

As necessary, a through-hole (not shown) for attachment, which extends from the upper surface to the lower surface, is formed at the center of the central land portion 8.

Figure 2:
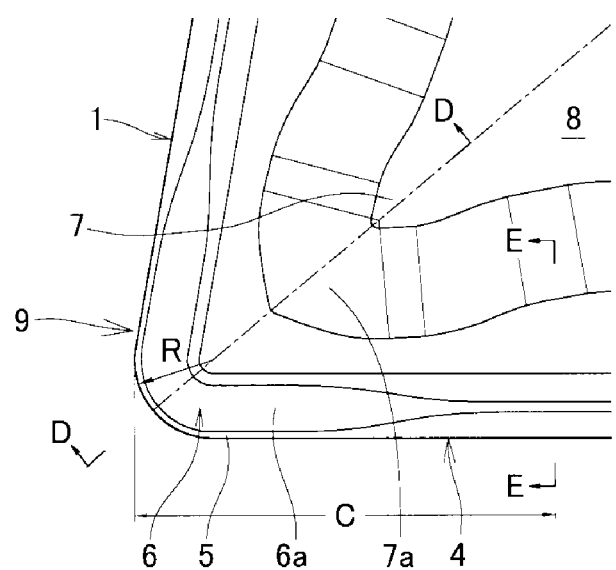
FIG. 2 is an enlarged plan view of an acute angle corner portion of the cutting insert of FIG. 1.
Figure 3:
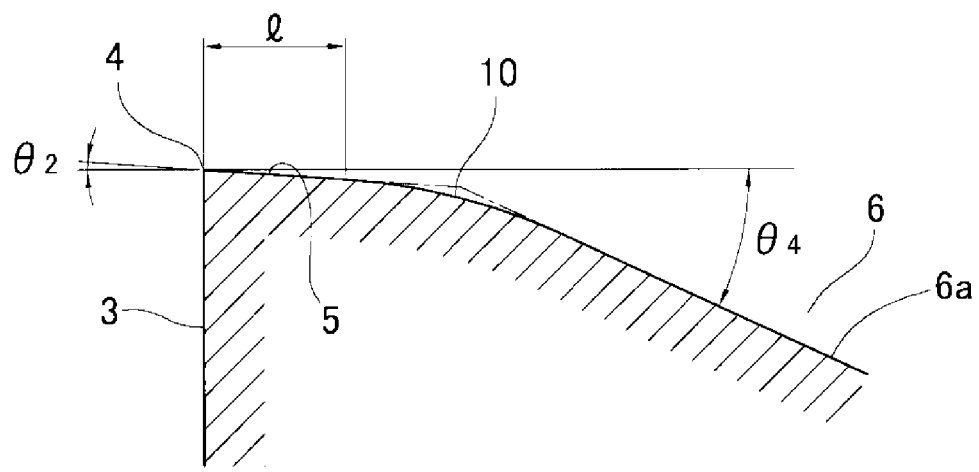
FIG. 3 is a cross-sectional view taken along line D-D of FIG. 2.

FIG. 2 is an enlarged plan view of an acute angle corner portion 9 of the cutting insert 1 of FIG. 1. FIG. 3 illustrates a cross section taken along the bisector (line D-D in FIG. 2) of the corner angle of the corner portion 9.

Figure 4:
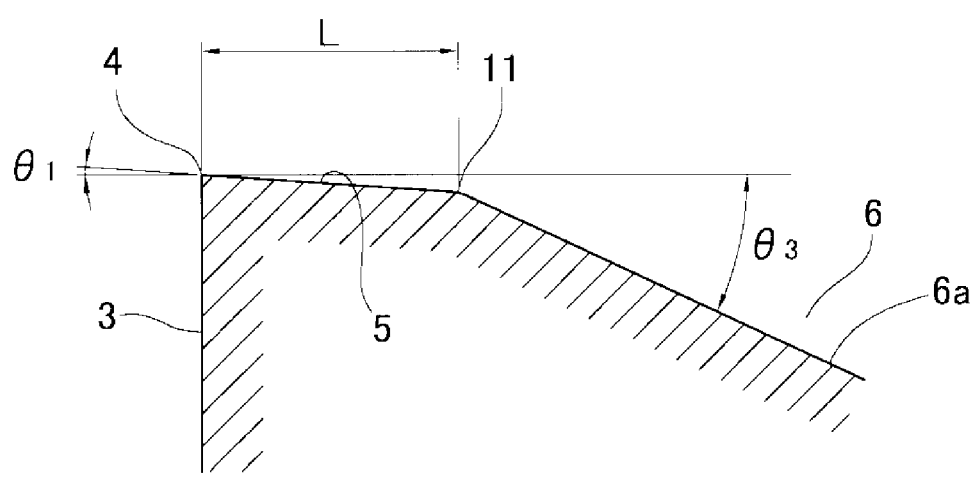
FIG. 4 is a cross-sectional view taken along line E-E of FIG. 2.

FIG. 4 illustrates a cross section taken along line E-E of FIG. 2, which is perpendicular to the linear cutting edge 4b.

Line E-E in FIG. 2 is located at a distance C from an end of the corner. The distance C is greater than the nose radius R of the corner portion 9.

As can be seen from FIGS. 3 and 4, the land 5 of the cutting insert 1 in the present example is a positive land, which has positive rake angles $\theta_1$ and $\theta_2$. However, the land 5 may be a negative land, whose rake angle is 0° or a negative angle. The rake angle is an angle with respect to a line parallel to the upper surface of the central land portion 8.

It is appropriate that the rake angles $\theta_1$ and $\theta_2$ of the land 5 be in the range of about −10° to +15°, considering the effect of disposing the land 5 (improvement in the edge strength). The rake angle $\theta_1$ and the rake angle $\theta_2$ may or may not be the same.

As illustrated in FIG. 3, the rake face 2 of the corner portion 9, which is a groove surface 6a of the breaker groove 6, has a rake angle of $\theta_4$. It is appropriate that $\theta_4$ be in the range of about 20° to 70°, considering the balance between smooth evacuation of a chip and edge strength.

A curved surface 10 is disposed between the land 5 and the rake face 2 that descends from an inner end of the land 5, that is, the groove surface 6a having the rake angle $\theta_4$. The curved surface 10 has a convex shape, and one end of the curved surface 10 is smoothly connected to the land 5. The other end of the curved surface 10 may be smoothly connected to the groove surface 6a of the breaker groove 6 as shown in the figure, or may be connected to the groove surface 6a through an angled portion or a stepped portion.

The radius of curvature of the curved surface 10 is 0.5 mm or greater in FIG. 3. By disposing such a curved surface, which has a comparatively large radius of curvature, between the land 5 and the groove surface 6a of the breaker groove 6, crater wear can be reduced while maintaining high edge strength.

Even when the curved surface 10, which has a radius of curvature of 0.5 mm or greater, is formed, the thickness of the land 5 is not reduced considerably as compared with a case where the curved surface 10 is not provided. Therefore, high edge strength can be maintained.

Figure 5:
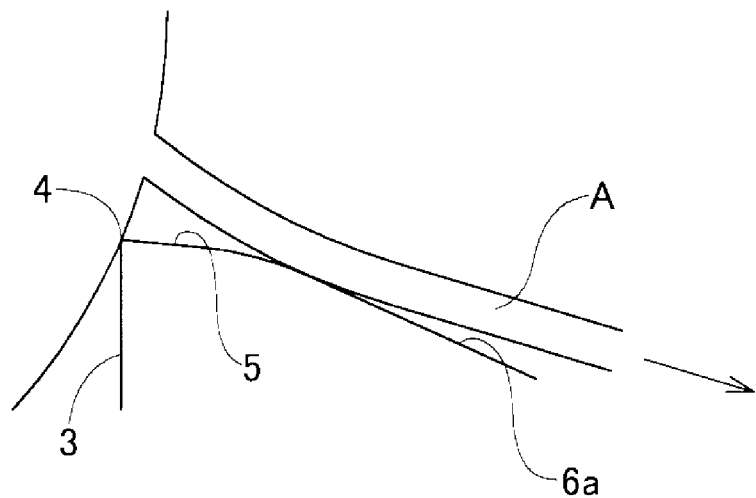
FIG. 5 is a schematic view illustrating a chip that is evacuated while sliding over a curved surface between a land and a groove surface of a breaker groove.

When the curved surface 10 is disposed, the effective width of the land 5 is reduced. Therefore, as illustrated in FIG. 5, a chip A is guided by the curved surface 10 and evacuated while contacting the curved surface 10 over a larger region (while sliding over the curved surface 10). Thus, the contact pressure applied by the chip A to the rake face 2 is dispersed and crater wear is reduced.

Figure 6:
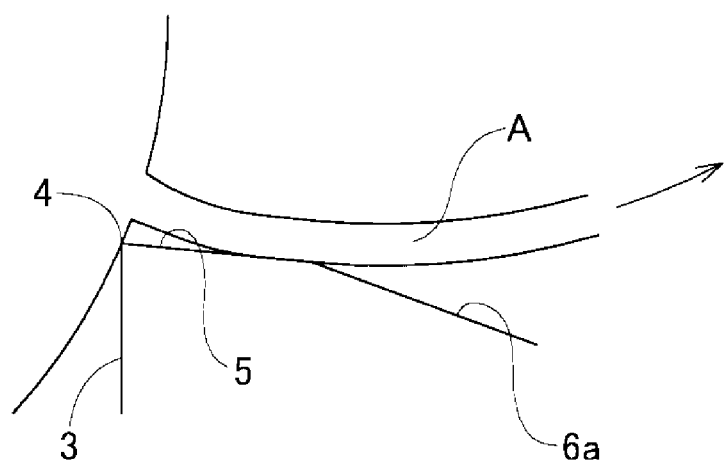
FIG. 6 is a schematic view illustrating a chip that is evacuated in a case where a curved surface is not disposed between the land and the groove surface of the breaker groove.

As illustrated in FIG. 6, if the groove surface 6a is connected to the land 5 through an angled portion, the chip A, which has contacted the surface of the land 5, tends to be evacuated while being separated from the groove surface 6a. Therefore, the surface pressure concentrates on a contact point where the chip A contacts the surface of the land 5, and crater wear is increased.

The curved surface 10 described above is effective in solving this problem. By providing the curved surface 10, even if the rake angle of the land 5 is reduced (and thereby the edge strength is increased), occurrence of crater wear is reduced.

When manufacturing the cutting insert 1 by using a powder-metallurgical method, a curved-surface shape (having a radius of curvature of about 0.2 mm) of a die, which serves to avoid stress concentration, is transferred to an intersecting portion between the land 5 and the groove surface 6a. However, because the radius of curvature is too small, an effect of dispersing the contact pressure of the chip A is not produced.

FIG. 3 illustrates a distance l from the corner cutting edge 4a to a connection point between the land 5, which is formed along the corner cutting edge 4a, and the curved surface 10. It is appropriate that the distance l be in the range of about 0.05 mm to ⅓ L (where L, which is referred to as the land width L in the present invention, is the distance from the cutting edge 4 to the intersection of an imaginary plane that is an extension of the land 5 and an imaginary plane that is an extension of the groove surface 6a). If the distance l is less than 0.05 mm, it is difficult to obtain high edge strength.

If the distance l is greater than ⅓ L, it becomes more likely that the chip A contacts the surface of the land 5 without reaching the curved surface 10, and the effect of disposing the curved surface 10 is reduced.

FIG. 4 illustrates a portion of the cutting insert 1 in the present example including the linear cutting edge 4b. In this portion, the land width L is in the range of about 0.15 mm to 0.8 mm, and the groove surface 6a of the breaker groove 6, which has a rake angle of $\theta_3$, is connected to the land 5 through a curved surface 11. The linear cutting edge 4b is formed in a region separated from an end of a corner of the cutting insert by a distance that is considerably greater than the nose radius R.

The curved surface 11 in the portion including the linear cutting edge 4b is provided in order to remove an edge. Therefore, the radius of curvature of the curved surface 11 is very small. For example, in FIG. 4, the radius of curvature of the curved surface 11 is 0.2 mm or less.

It is appropriate that the rake angle $\theta_3$ of the groove surface 6a at this position be in the range of about 20° to 70°, as with the rake angle $\theta_4$ of the groove surface 6a at the corner portion 9. The rake angle $\theta_4$ of the groove surface 6a at the corner portion 9 and the rake angle $\theta_3$ of the groove surface 6a at the linear cutting edge portion may or may not be the same.

Because crater wear is very unlikely to occur in a region along the linear cutting edge 4b, as in the cutting insert 1 in the present example, the region is preferably designed with an emphasis on strength compared with a region along the corner cutting edge 4a. By using the cross-sectional structure shown in FIG. 3 and the cross-sectional structure shown in FIG. 4 in combination, the cutting insert 1 having high strength in its entirety can be realized.

The breaker ridge 7 includes the central land portion 8 and a breaker wall 7a surrounding the central land portion 8. The breaker ridge 7 is a ridge in which the breaker wall 7a, which applies evacuation resistance to a chip, ascends diagonally from a groove bottom of the breaker groove 6 toward the central land portion 8. The breaker ridge 7 is shaped so as to protrude in a direction along the bisector of the corner cutting edge 4a and in a direction toward the cutting edge at a central portion of the linear cutting edge 4b in the longitudinal direction. The shape of the breaker ridge 7 may be any appropriate shape, and is not limited to the shape shown in the figures.

In the cutting insert 1 in the present example, the cross-sectional shape of an obtuse angle corner portion along the bisector of the corner angle is the same as that of the acute angle corner portion 9.

If an obtuse angle corner of a cutting insert is not frequently used, crater wear of the rake face 2 at the obtuse angle corner is not likely to increase considerably. Therefore, the obtuse angle corner need not have the curved surface, which connects the land 5 and the groove surface 6a of the breaker groove 6 to each other.

The result of a performance evaluation test of the cutting insert 1 according to the present invention will be described below. The evaluation test was performed to examine the relationship between the radius of curvature of the curved surface 10, which is disposed between the land 5 and the groove surface 6a of the breaker groove 6, and the width of crater wear that occurs on the rake face 2.

Samples of cutting inserts having the following properties were made and used in the evaluation test. Material: cemented carbide, the corner angle of an acute angle corner: 80°, the diameter of the inscribed circle of the linear cutting edge 4b: 12.7 mm, the land width L: 0.2 mm and 0.3 mm, and the rake angle of the groove surface 6a of the breaker groove 6 ($\theta_4$ in FIG. 3: 25°).

The radii of curvature of the curved surfaces 10, shown in FIG. 3, of ten cutting inserts used in the evaluation test were 0 mm, and 0.2 mm to 1.0 mm in increments of 0.1 mm.

In each sample, the rake angle $\theta_2$ of the land 5 and the rake angle $\theta_4$ of the groove surface 6a of the breaker groove 6 were as follows.

$\theta_2$: 0°
$\theta_4$: 25°

Figure 7:
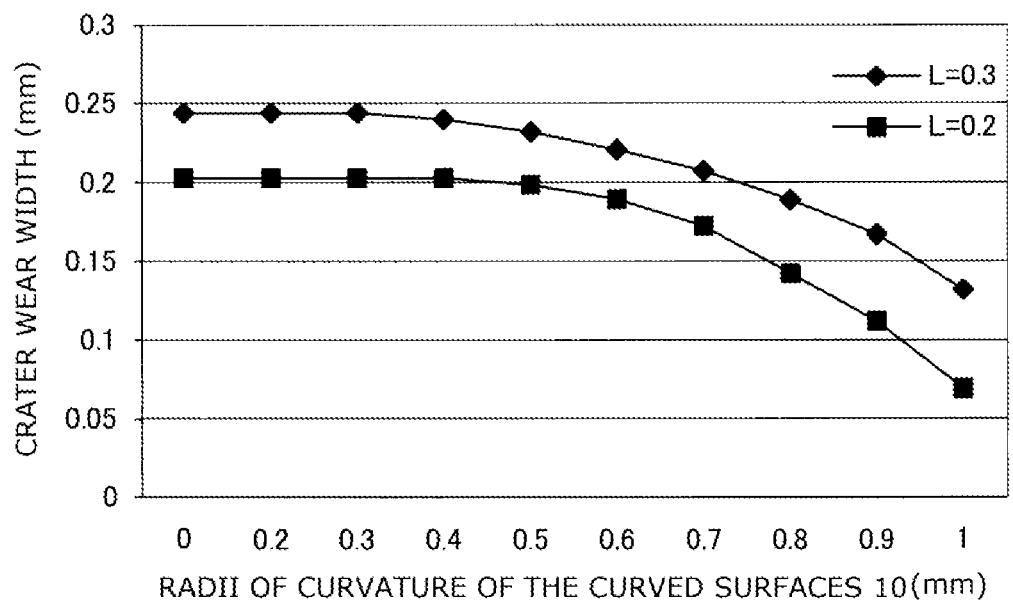
FIG. 7 is a graph showing the result of measuring crater wear of a rake face in an evaluation test.

By using these samples, workpieces made of SUS316 were turned under the same conditions (cutting speed v: 120 m/min, depth of cut ap: 25 mm, feed speed f: 0.3 mm/rev), and the degree of occurrence of crater wear on the rake face was examined. FIG. 7 shows the result.

Figure 8:
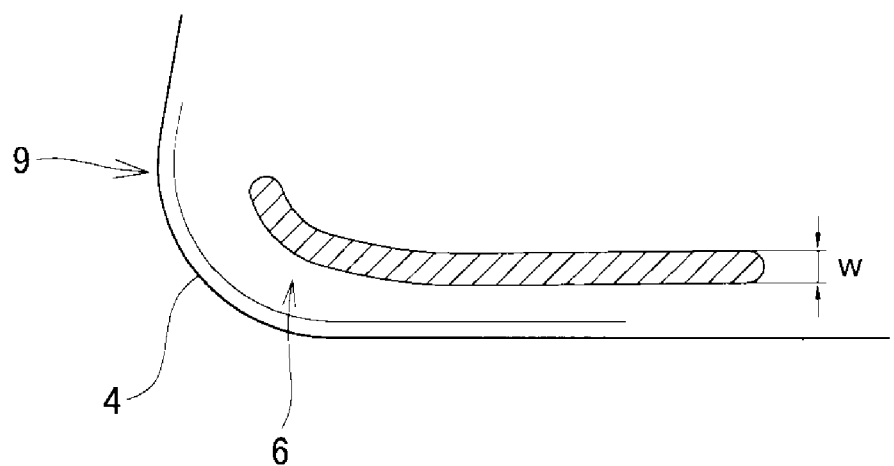
FIG. 8 illustrates a method of measuring a crater wear width in the evaluation test.

The crater wear width shown in FIG. 7 was obtained by measuring the width w in a direction perpendicular to the linear cutting edge 4b shown in FIG. 8.

The result of the evaluation test shown in FIG. 7 demonstrates the effectiveness of disposing a curved surface having a radius of curvature of 0.5 mm or greater between the land 5 of the corner portion 9 and the groove surface 6a of the breaker groove 6.

By disposing the curved surface, it is possible to provide the cutting insert with both high edge strength and crater wear resistance and to improve the durability of the cutting insert.

In the above description, a rhombic cutting insert is used as an example. However, the present invention can be applied to a cutting insert having another shape, such as a triangle or a rectangle.

REFERENCE SIGNS LIST

1 cutting insert
2 rake face
3 flank face
4 cutting edge
4a corner cutting edge
4b linear cutting edge
5 land
6 breaker groove
6a groove surface
7 breaker ridge
7a breaker wall
8 central land portion
9 corner portion
10, 11 curved surface
l distance from corner cutting edge to connection point between land and curved surface
L land width
$\theta_1$, $\theta_2$ rake angle of land
$\theta_3$, $\theta_4$ rake angle of groove surface of a breaker groove
A chip
w crater wear width

The invention claimed is:

1. A cutting insert comprising:
   a rake face;
   a flank face;
   a cutting edge formed at a ridge where the rake face and the flank face intersect and including a corner cutting edge and a linear cutting edge;
   a land provided on the rake face along the cutting edge;
   a breaker groove provided in the rake face inside of the land; and
   a convex curved surface formed between an inclined groove surface of the breaker groove and the land; and
   the land having a distance from the corner cutting edge to a connection point with the convex curved surface being 0.05 mm or greater and less than or equal to ⅓ of a land width (L) of the land formed along the linear cutting edge,
   wherein a radius of curvature of the convex curved surface in a portion including the corner cutting edge is 0.5 mm or greater and is larger than a radius of curvature of the convex curved surface in a portion including the linear cutting edge.

2. The cutting insert according to claim 1, wherein the land width (L) of the land formed along the linear cutting edge is in a range of 0.15 mm to 0.8 mm.

3. The cutting insert according to claim 1, wherein a rake angle of the inclined groove surface of the breaker groove formed along the corner cutting edge is in a range of 20° to 70°.

4. The cutting insert according to claim 2, wherein a rake angle of the inclined groove surface of the breaker groove formed along the corner cutting edge is in a range of 20° to 70°.

5. The cutting insert according to claim 1, further comprising a breaker ridge, wherein the breaker ridge includes a breaker wall that ascends from a groove bottom of the breaker groove toward a central land portion of the breaker ridge.

* * * * *